United States Patent

Metzroth

[11] Patent Number: 4,468,409
[45] Date of Patent: Aug. 28, 1984

[54] METHOD FOR THE CONTINUOUS PRODUCTION OF CONFECTIONS

[75] Inventor: Douglas J. Metzroth, Louisville, Ky.

[73] Assignee: Chemetron Process Equipment, Inc., Louisville, Ky.

[21] Appl. No.: 437,661

[22] Filed: Oct. 29, 1982

Related U.S. Application Data

[63] Continuation-in-part of Ser. No. 298,685, Sep. 2, 1981, abandoned.

[51] Int. Cl.³ .................. A23G 3/00; A23G 3/14; A23G 3/16
[52] U.S. Cl. .................. 426/659; 426/492; 426/660; 127/16; 127/58; 127/61
[58] Field of Search ............ 426/659, 520, 658, 492, 426/660; 127/16, 58, 61

[56] References Cited

U.S. PATENT DOCUMENTS

| | | | |
|---|---|---|---|
| 2,507,477 | 5/1950 | MacDonald | 426/659 |
| 3,140,201 | 7/1964 | Reimers et al. | 426/659 |
| 3,340,071 | 9/1967 | Harrell | 426/492 |
| 3,796,808 | 3/1974 | Antonelli et al. | 426/492 |
| 3,934,053 | 1/1976 | Kitson | 426/659 |
| 3,983,862 | 10/1976 | Spriet | 127/61 |

Primary Examiner—Jeanette M. Hunter
Attorney, Agent, or Firm—Burns, Doane, Swecker & Mathis

[57] ABSTRACT

A process for preparing a grained confection from a supersaturated sugar solution on a continuous basis is provided. A homogeneous aqueous solution comprised of corn syrup and sucrose is continuously fed to a heating apparatus having an inlet and an outlet with the heating means interposed therebetween to provide an increasing temperature to the solution from the inlet to the outlet. The solution is heated to a predetermined temperature and water vapor is continuously separated from the solution to form a sugar solution of a predetermined concentration which is supersaturated at up to 185° F. The concentrated sugar solution is continuously cooled in 33 seconds or less to below its saturation temperature and a fine grained confection is produced having minute crystals therein.

17 Claims, 1 Drawing Figure

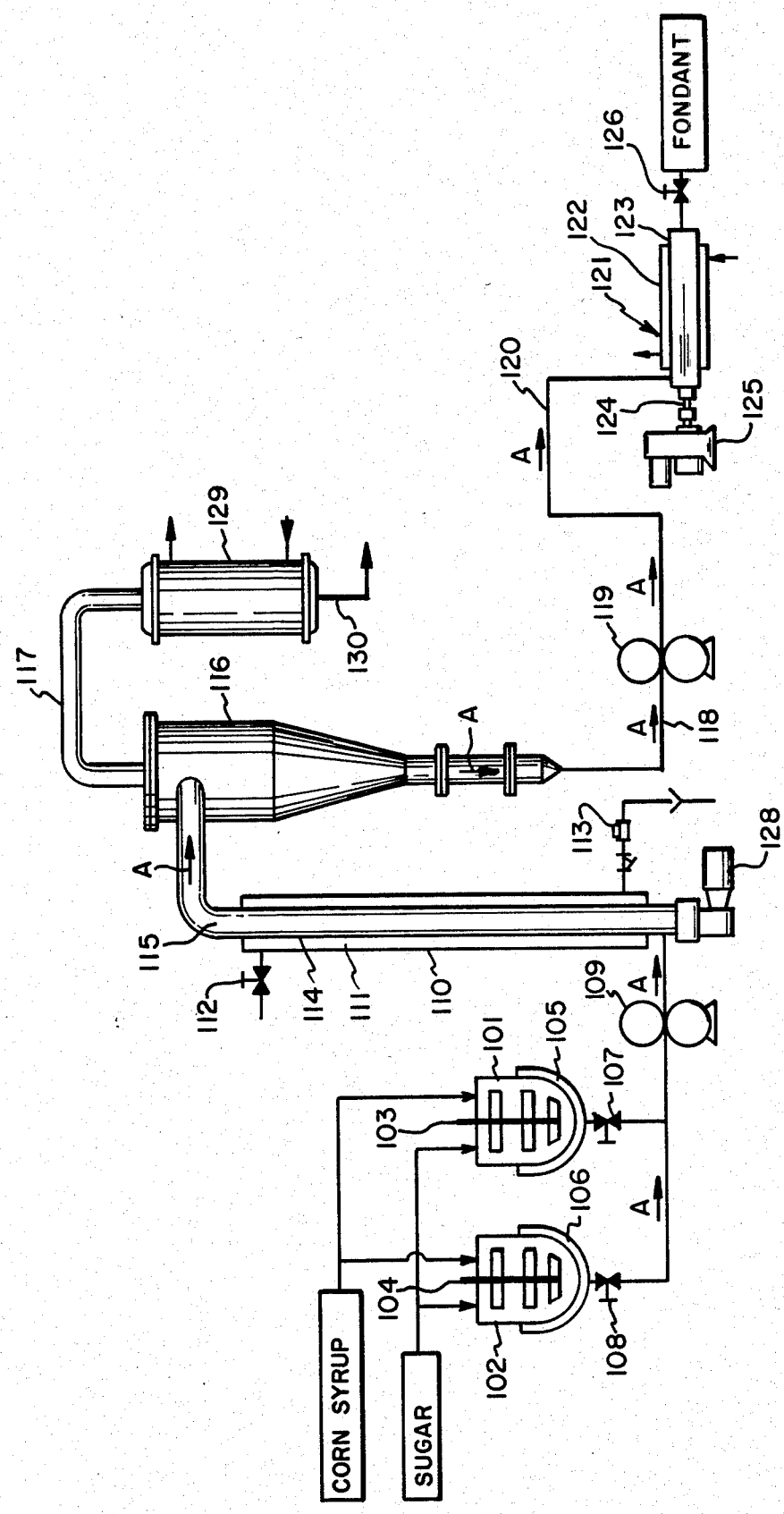

METHOD FOR THE CONTINUOUS PRODUCTION OF CONFECTIONS

RELATED APPLICATION

This application is a continuation-in-part of application Ser. No. 06/298,685, filed Sept. 2, 1981 now abandoned.

BACKGROUND OF THE INVENTION

This invention relates to a process for preparing a grained confection and more particularly to a process for preparing a grained confection from a supersaturated sucrose solution.

Confections are sugar-based products such as candies, icings and the like. Generally, confections are divided into three categories: hard candies, chewy confections and aerated confections. The chewy confections and aerated confections are further subdivided into the general categories of a supersaturated or unsaturated sugar solution confections and are also referred to as grained and nongrained confections, respectively. More particularly, grained confections contain sugar which is in the crystalline form and are commonly referred to as the fondant types. Exemplary of fondant-based confections are icings, cream centers, fudge, marshmallows and the like.

More particularly, the fondant-type confections are characterized by a low moisture content and requiring limited mastication by the consumer. Further, it is desirable that fondant-type confections have minute sugar crystals. "Minute sugar crystals" as used herein means and refers to sugar crystals of such a size that they are tacitly imperceptible when eaten. Sugar crystals of less than 10 micron size are generally considered minute.

"Sugar" as used herein means and refers to the general class of compounds known as saccharides and polysaccharides and includes, but is not limited to, sucrose, glucose, fructose, maltose, dextrin and the like.

In preparing fondant or other supersaturated sugar solutions, the basic raw materials are sucrose and corn syrup. Corn syrup contains, as primary constituents, dextrin, dextrose and glucose. The corn syrup retards the crystallization of sucrose in solution.

As is well recognized by those skilled in the art, crystal size is a function of both concentration of crystallizable compound and cooling rate. Low cooling rates provide large crystals, whereas rapid cooling rates provide generally fine crystals. In addition, the purity of a solution of a particular compound also governs the crystal size. High purity solutions tend to yield large crystals, whereas low purity solutions tend to yield fine crystals.

Typically, confections and more particularly fondant confections are prepared in a batch process wherein an aqueous solution of corn syrup and sucrose is formed at a concentration of about 60 to 75 percent by weight solids. This solution is normally heated at atmospheric pressure to about 85 percent solids, yielding a temperature of about 237° to 243° F. The solution is then cooled to about 160° to 131° F. which causes the sucrose to crystallize from the solution and form a fondant or similar confection with the sucrose crystals homogeneously distributed throughout the dextrin media. Normally, the ratio of sucrose to corn syrup is about 70–80 parts by weight sucrose to 20–30 parts by weight corn syrup. The dextrin in corn syrup is primarily used to control crystallization of the sucrose from the solution and functions as a humectant while allowing the concentration of soluble solids in the liquid phase to be at a level of about 80 percent which will prevent growth of microorganisms. The final fondant confection normally has a solids concentration of about 85 percent total solids. Generally, when sucrose concentrations, as a solids component, exceed 80 percent, the purity of the solution is such that large crystals of sucrose are grown upon cooling and impart a gritty texture to the fondant when consumed. This gritty texture is characterized as palatable sugar crystals as opposed to minute sugar crystals where no grit is present and the consumer cannot feel the crystals within the fondant when eaten.

Those skilled in the confectionary art normally prepare fondant confections in a batch process wherein the operators must be highly skilled to recognize the visible and tactile characterics of the aerated confection in order to adjust the processing parameters to provide a fondant with the minute sugar crystals therein.

It is desired by those manufacturers, particularly of fondant which is the base material for several other confections including icing, to produce such fondant on a large scale while maintaining the desirable characteristics of the material. It is desired by the manufacturers of confections to have a continuous process wherein large quanitities of fondant can be produced as a base for grained confections wherein such fondant has minute sugar crystals.

Thus, in accordance with the present invention, a continuous process for producing confections from supersaturated sucrose solutions is provided.

BRIEF DESCRIPTION OF THE INVENTION

A process for preparing a confection from a supersaturated sugar solution on a continuous basis is provided. A homogeneous aqueous solution comprised of corn syrup and sucrose is continuously fed to a heating apparatus having an inlet and an outlet with the heating means interposed therebetween to provide an increasing temperature to the solution from the inlet to the outlet. The solution is heated to a predetermined temperature and water vapor is continuously separated from the solution to form a sugar solution of a predetermined concentration which is supersaturated at up to 185° F. The concentrated sugar solution is continuously cooled at a predetermined rate of time to below its saturation temperature and a fine grained confection is produced. The confection has minute sugar crystals therein.

DETAILED DESCRIPTION OF THE INVENTION

The homogeneous aqueous solution which is comprised of corn syrup and sucrose is one in which all the constituents are completely dissolved. Typically, the solution has a concentration range of 60 to 80 percent by weight solids, and more preferably 65 to 70 percent by weight solids. The ratio of sucrose to corn syrup is about 70–85 parts by weight sucrose to 15–30 parts by weight corn syrup. More particularly, sucrose concentrations of about 85 percent by weight are preferred. The corn syrup and sugar along with the requisite water are charged to a premix tank and heated in order to solubilize the sucrose. Typically, the heating temperature is up to about 158° F. After the solution is homogeneous, it is continuously fed to the heating apparatus. The heating apparatus imparts an increasing temperature to the solution from the inlet of the apparatus to the outlet of the apparatus. A typical heating apparatus is one which provides good heat transfer from the apparatus contact surface to the solution. One particularly useful apparatus is a thin film evaporator wherein the material is fed through the inlet and the material is disposed about the wall of the unit in a thin film in order to provide such heat transfer. The solution is heated to a temperature of about 239° F. to 246° F., thus causing the generation of water vapor within the evaporator since the boiling point of the solution, as made, is below 239° F. Upon exiting the heating apparatus, the water vapor is separated from the liquid phase to provide a supersaturated solution upon cooling. The separation of water vapor from sugar solution can be provided by allowing the water vapor to be discharged to the ambient, or more preferably by a cyclone separator which separates the two phases, disposing of the gaseous phase, i.e., water vapor, and directing the liquid phase to the next stage of the process. The liquid phase, i.e., the concentrated sugar solution, is supersaturated at a temperature below 158° F. At this point, the sugar solution is between about 80 to 90 percent by weight solids. This high solids concentration is desirable in order to prevent growth of microorganisms and add shelf life to the fondant and subsequently produced confection. The sugar solution is then continuously cooled below the supersaturation temperature, i.e., below about 158° F. to precipitate out sucrose crystals. More preferably, the sugar solution is continuously cooled to a temperature below about 140° F., and most preferably between about 140° to about 131° F. The cooling should be imparted rapidly to the solution in order to produce finely divided crystals which are minute and thus provide a homogeneous, creamy and acceptable product. An acceptable product is achieved when the solution is cooled at an overall heat transfer coefficient of at least about 150 BTU/HR/FT$^2$/°F.

In the case of all fondants and particularly high sucrose fondants, i.e., about 85 percent sucrose or greater of the solids being fed to the cooling apparatus, it is necessary to rapidly cool the solution, i.e., having a temperature reduction from the homogeneous solution to the supersaturated solution at 135° F. in 33 seconds or less. There is no lower limit on the rapidity of the cooling. Thus, the rapidity of cooling is dependent upon the apparatus used to cool the sugar solution. Most preferably, a scraped surface heat exchanger is used for the cooling process which operates in a similar manner as the evaporator previously described so that good heat transfer is imparted in the process.

Extremely small and uniform product crystals can be attained only through careful control of the formulation of crystal nuclei. This requires positive control to assure that large quantities of nuclei are formed to inhibit crystal growth. To achieve a preponderance of nuclei, a very rapid cooling rate must be maintained as is realized utilizing the above described scraped surface heat exchanger or the like. Additionally, nuclei residence time in the crystallizer must be short to avoid seeding of the mass and promoting crystal growth. The present invention accomplishes these objectives to provide a fine grained confection having minute crystals therein.

After the aerated confection or fondant is cooled to about 131° F., it may be blended with other materials to produce icings, flavored creams and similar confections, or may be charged to suitable containers for later use by bakeries, candy factories and the like.

As is recognized by those skilled in the art, other materials may be added to the homogeneous aqueous solution in order to impart particular properties adapting the fondant for its final use in confections. For example, sorbitol may be added to give a more uniform and whiter cream along with flavorings or the like or the fondant may be aerated to provide similar properties. However, most preferably, the flavorings, fats and other materials are added subsequent to the production of the base fondant.

The process of the invention is more fully illustrated by reference to the following drawing.

BRIEF DESCRIPTION OF THE DRAWING

FIG. 1 is a schematic representation of the apparatus useful in practicing the process in accordance with the invention.

DETAIL DESCRIPTION OF THE DRAWING

Referring now to the drawing, two mixing tanks 101 and 102 are provided with stirrers 103 and 104 and steam jackets 105 and 106. The vessels have drain valves 107 and 108.

The valves are in fluid communication with pump 109 which is adapted to pump the aqueous solution to evaporator 110. The evaporator 110 is a thin-film evaporator and preferably a San-Loc TM Evaporator manufactured by Chemetron Process Equipment, Inc. The evaporator 110 is provided with a steam jacket 111 which is fitted with a regulator 112 for introducing the desired pressure steam into jacket 111. The jacket 111 is fitted with a steam outlet 113. The evaporator has internal rotating blades (not shown) for wiping charged solution against the evaporator walls 114. The internal chamber 115 which the solution passes is in fluid communications with a cyclone separator 116 which removes water vapor through overhead line 117 in fluid flow communication with the evaporator while allowing a concentrated sugar solution to pass in a downward direction into line 118 which is in fluid flow communication with pump 119 which moves the sugar solution through line 120 into cooling unit 121. The cooling unit 121 is comprised of a jacket 122 which is adapted to receive and discharge cooling water. The jacket is positioned about the cooling chamber 123. Preferably, the cooling unit 121 is a Votator ® scraped surface heat exchanger manufactured by Chemetron Process Equipment, Inc. The cooling unit 121 has a cylindrical interior and is fitted with blades in a similar manner as was described with respect to the evaporator 110. The blades are turned by shaft 124 which is driven by electric motor 125. The line from the cooling unit is directed to valve 126 which is a three-way valve allowing for the collection of material per se or for routing the material to a subsequent process.

It is to be noted that throughout the process flow of the material from start to finish is in the direction of the arrows A.

In operation, desired quantities of corn syrup, sugar and water are charged to mixing tanks 101 and 102. The tanks 101 and 102 and the contents thereof are heated by means of steam passing through jackets 105 and 106 while stirrers 103 and 104 are activated. Sufficient agitation is provided by stirrers 103 and 104 along with heat in order to form a homogeneous aqueous solution of the corn syrup, sugar and water. Typically, the corn syrup, sugar and water are heated to about 180° F.

Because the process is continuous, when valve 107 is open valve 108 is closed, and vice versa. Thus, when one of mixing tanks 101 or 102 is drained of its contents, the valve at the bottom of the other tank is opened and the emptied tank is recharged. From the tanks 101 or 102 the homogeneous aqueous solution is pumped by pump 109 to the evaporator 110. The blades of the evaporator (not shown) are turned by motor 128 and wipe the solution along the wall 114 of the evaporator 110 to effect efficient heat transfer. The chamber 115 and the aqueous solution are heated by steam provided through regulator 112, and the jacket 111 is provided with a steam outlet 113. Typically, the steam temperature required is between 284° F. to 356° F. in order to provide sufficient heat for the required temperature rise of the material within the evaporator.

After the material has been passed through the evaporator, there is a two phase system, a liquid phase of sugar solution and a gaseous phase primarily of water vapor. This mixture is charged into cyclone separator 116 which discharges the gaseous phase or water vapor through overhead line 117 and into condenser 129 where the vapor is cooled to condense it to water and the water is then discharged from discharge 130.

The sugar solution at the relatively high temperature of above 221° F. is charged to line 118 from the cyclone separator 116 through pump 119, moving the material through line 120 and into the cooling unit 121. While in the cooling unit 121, the sugar solution is rapidly cooled at an overall heat transfer coefficient of about 150 BTU/HR/FT$^2$/°F. minimum (achieved in equal to or less than 33 seconds contact time) to 185° F. or below, and more preferably below 140° F.

Cooling water is circulated through jacket 122 to provide the requisite cooling for the cooling unit 121. From the cooling unit 121 the material is fed through the valve 126 to either other processes, for example for making icing, cream centers or the like, or is directly packaged for subsequent use.

Thus, in accordance with the present invention a process for preparing a grained confection from a supersaturated sucrose solution such as fondant is provided which allows for high production rates due to the continuous nature of the process. Further, the process of the invention also allows for a fondant or other supersaturated sucrose confection having minute sugar crystals therein.

The solution cooling phase can best be further illustrated by presenting operating test data to demonstrate finished product characteristics based upon residence time and heat transfer. A standard 6"×24" Votator scraped surface heat exchanger with an oversized mutator shaft (5 7/16" diameter) was used. Unit residence volume was calculated to be 166.4 in$^3$. A product was fed to the heat exchanger at a first rate of 1080#/HR and a temperature of 239° F. The product remained in the heat exchanger for 30 seconds and exited at 150° F. The overall heat transfer coefficient was determined to be 152 BTU/HR/FT$^2$/°F. The feed rate was then reduced to 915#/HR which resulted in a residence time within the heat exchanger of 35.4 seconds. Heat exchanger product inlet and outlet temperatures at the reduced feet rate were 241° and 152° F., respectively, and the overall heat transfer coefficient was on the order of 130 BTU/HR/FT$^2$/°F. Microscopic analyses, conducted to determine the product particle size distribution of a product manufactured under like conditions, namely, a cooling residence time of about 30 seconds, SAMPLE A, and a cooling residence time of about 35 seconds, SAMPLE B, revealed a distribution of

| Particular Size μm | SAMPLE A % | SAMPLE B % |
|---|---|---|
| 0-1 | 0.0 | 35.0 |
| 1-5 | 90.1 | 25.0 |
| 5-10 | 9.9 | 33.0 |
| >10 | 0.0 | 7.0 |

The test data provided clearly indicate that fondant must be cooled at a controlled cooling rate to continuously produce a satisfactory product. Residence time and heat transfer effect the crystallization phase of the process. At a 30 second residence time and heat transfer coefficient of 152 BTU/HR/FT$^2$/°F., the tested product exhibited a very smooth texture, no crystals larger than 10 μm, while the product held for about a 35 second residence time and heat transfer coefficient of 130 BTU/HR/FT$^2$/°F. exhibited a rough texture, 7% of its crystals exceeding 10 μm. The difference in the two samples was organoleptically determined independently. SAMPLE B gave a very sandy sensation to the bite while SAMPLE A did not exhibit this undesirable sandy characteristic.

When the crystallization process is conducted as is herein disclosed, the product character changes to one of increased viscosity as residence time exceeds about 33 seconds, a change which also adversely affects heat transfer. The test data demonstrates that the coefficient of heat transfer is reduced from 152 to 130 BTU/HR/FT$^2$/°F. as the residence time increases from 30 to 35.4 seconds. Extended process running times have indicated that a minimum coefficient of heat transfer on the order of about 150 BTU/HR/FT$^2$/°F. must be maintained to realize a reliable continuous process to produce an acceptable fine grained confection.

Although the invention has been described with reference to specific materials and specific apparatus, the invention is only to be limited so far as is set forth in the accompanying claims.

I claim:

1. A process for preparing a fine grained confection from a sucrose solution on a continuous basis comprising:

forming a homogeneous aqueous solution comprised of corn syrup and sucrose;

continuously feeding the homogeneous solution to a heating apparatus having an inlet and an outlet with heating means interposed therebetween to provide an increasing temperature to said solution from the inlet to the outlet;

heating the homogeneous solution to a predetermined temperature;

continuously separating water vapor from said solution to form a sugar solution of a predetermined concentration which is supersaturated at up to 185° F.;

continuously cooling the supersaturated sugar solution to at or below 185° F. at a residence time of equal to or less than 33 seconds in a filled vessel; and recovering a grained confection so produced.

2. The process of claim 1 wherein said homogeneous aqueous solution has a greater concentration of sucrose than corn syrup.

3. The process of claim 2 wherein said homogeneous aqueous solution has a ratio of sucrose to corn syrup of 70-85 parts by weight sucrose to 15-30 parts by weight corn syrup.

4. The process of claim 1 wherein said homogeneous aqueous solution has a concentration of 60 to 80 percent by weight solids.

5. The process of claim 1 wherein said heating means is a thin film evaporator.

6. The process of claim 1 wherein said predetermined temperature is about 239° to 246° F.

7. The process of claim 6 wherein said predetermined temperature is between 243° and 246° F.

8. The process of claim 1 wherein the predetermined concentration of said sugar solution is between about 80 to 90 percent by weight solids.

9. The process of claim 8 wherein the predetermined concentration of said sugar solution is between about 88 to 90 percent by weight solids.

10. The process of claim 1 wherein the water vapor is separated from the solution by a cyclone separator.

11. The process of claim 1 wherein said grained confection has minute sugar crystals therein.

12. The process of claim 11 wherein said grained confection is composed substantially of minute sugar crystals.

13. The process of claim 1 wherein said grained confection is fondant.

14. The process of claim 1 wherein said cooling is provided by a scraped surface heat exchanger.

15. The process of claim 1 wherein said supersaturated sugar solution is cooled to at or below 140° F.

16. The process of claim 15 wherein said supersaturated sugar solution is cooled to between about 140° to about 131° F.

17. The process of claim 1 wherein said cooling is conducted at an overall heat transfer coefficient of at least 150 BTU/HR/FT$^2$/°F.

* * * * *